No. 657,857. Patented Sept. 11, 1900.
W. H. COOK.
PROCESS OF COOKING COTTON SEED.
(Application filed May 27, 1899.)
(No Model.)
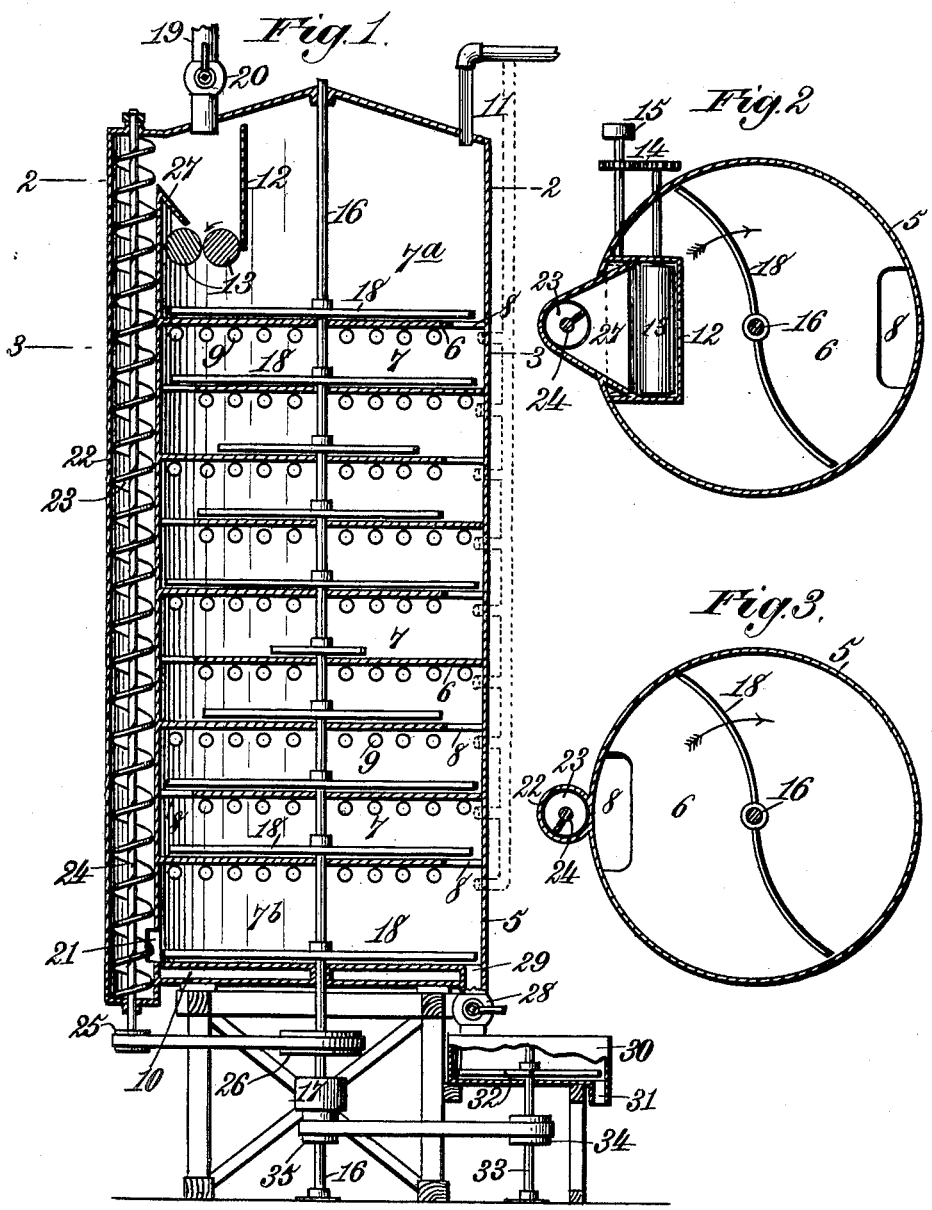
Witnesses
Robert Everett
Inventor
Walter H. Cook

UNITED STATES PATENT OFFICE.

WALTER H. COOK, OF NEW ORLEANS, LOUISIANA.

PROCESS OF COOKING COTTON-SEED.

SPECIFICATION forming part of Letters Patent No. 657,857, dated September 11, 1900.

Application filed May 27, 1899. Serial No. 718,577. (No specimens.)

*To all whom it may concern:*

Be it known that I, WALTER H. COOK, a citizen of the United States, residing at New Orleans, in the parish of Orleans and State of Louisiana, have invented new and useful Improvements in Processes of Cooking Cotton-Seed Meats in a Vacuum, of which the following is a specification.

This invention has for its object to provide an improved and economical process for cooking cotton-seed meats in such manner as to obtain a higher grade of products, avoid all danger of burning or scorching the material under treatment, and greatly lessen the expense by reason of cooking at a lower temperature, as under a vacuum and with constant stirring of the cotton-seed meats while in thin layers.

To these ends my invention is a process of cooking cotton-seed meats, which consists in exposing said meats in thin layers to the action of heat under a vacuum and maintaining the meats in a constant state of agitation while cooking at a low temperature, as hereinafter described and claimed.

The annexed drawings illustrate an improved apparatus adapted to the practice of my process for the cooking of cotton-seed meats under a vacuum.

Figure 1 is a sectional elevation of my improved apparatus for cooking cotton-seed. Fig. 2 is a horizontal section of the same on the line 2 2 of Fig. 1. Fig. 3 is a similar section on the line 3 3 of Fig. 1.

The reference-numera 15 designates a cylindrical upright casing which is closed at both ends. In this casing there are a number of floors or horizontal partitions 6, dividing the apparatus into a vertical series of cooking-compartments 7, arranged one above another. Each floor or partition 6 has an opening 8, through which an upper compartment communicates with the one next below. The openings 8 in the several partitions or floors 6 are not in line with each other, but are located alternately in opposite sides of the apparatus, as shown. The upper compartment $7^a$ and the lower compartment $7^b$ may each be of greater depth than the intermediate compartments. Beneath the floor 6 of each intermediate compartment 7 and upper compartment $7^a$ there is a series of steam-coils 9, and beneath the lower compartment $7^b$ there is preferably a steam jacket or chamber 10, or, if desired, any other suitable means may be adopted for heating the several compartments of the cooker by steam. An exhaust-pipe 11 is extended from the upper compartment of the cooker to connect with an exhaust-pump or other suitable appliance for effecting and maintaining a vacuum in the several communicating compartments.

In one side of the upper compartment $7^a$ there is a vertically and transversely arranged shield 12, Fig. 1, and between the lower edge of this shield and the adjacent wall of the casing 5 there is arranged a pair of crushing-rolls 13, the shafts of which are connected by gears 14, Fig. 2, or otherwise in such manner as to rotate toward each other for crushing the material fed thereto and dropping it onto the floor of the upper cooking-compartment. The shaft of one of the crushing-rolls 13 may be provided with a pulley 15 for applying power to drive said rolls.

A vertical rotary shaft 16 is extended through the several compartments of the cooker and may be driven by power applied to a gear or pulley 17, located on said shaft below the casing or shell of the apparatus. This vertical rotary shaft 16 carries a number of sweeps or stirrers 18, as shown in the drawings arranged just above the floor of each compartment, for the purpose of agitating the material that is being cooked and to carry it around in a thin layer to an opening 8, through which it will fall into the next lower compartment, and so on in a serpentine direction from above downward through the several cooking-compartments, being meanwhile subjected to the action of steam heat applied in a vacuum that is induced by a suitable exhaust appliance with which the pipe 11 connects.

The decorticated cotton-seed or "meats" enter the upper compartment of the cooker through an inlet 19, Fig. 1, which may connect with a hopper. This inlet 19 is located above the crushing-rolls 13 and is provided with a valve 20 for controlling the feed. From the rolls 13 the crushed material falls onto the floor of the upper compartment $7^a$, whence it is gradually discharged by the sweeps or stirrers 18 through the opening 8 into the next lower compartment 7, and so on through the several compartments of the cooker to the lowermost compartment 7$^b$, the serpentine movement of the meats being kept up throughout the entire passage through the cooker. The lowermost compartment 7$^b$ communicates through an opening 21, Fig. 1, with the lower end of a vertical cylindrical casing 22 at one side of the main casing or shell 5 of the cooker. In this casing 22 there is an upright screw conveyer 23, having a shaft 24, with pulley 25 thereon, which is belted to a pulley 26 on the stirrer-shaft 16 and through which the said screw conveyer is driven. When the meats get down into the compartment 7$^b$, they are pushed by the stirrers 18 into the conveyer 23, which passes the partly-cooked material up through the casing 22 and dumps it over a spreader-apron 27, Figs. 1 and 2, onto the crushing-rolls 13 to pass again through the cooker. When the cotton-seed meat is sufficiently cooked, a valve 28 is opened in an exit 29, leading from the lowermost cooking-compartment 7$^b$, and the cooked material, pushed by the stirrers 18, is thus allowed to drop into a receiver 30, having an exit 31, to which the cooked material is carried by sweeps 32, mounted in said receiver on a vertical shaft 33, having a pulley 34, that is belted to and driven from a pulley 35 on the shaft 16. From the receiver 30 the crushed and cooked cotton-seed material is carried through any of the processes usually employed in forming an oil-cake and expressing the oil.

In starting this cooking apparatus the valve 28 is closed, the stirrers 18, conveyer 23, and crushing-rolls 13 are put in operation, and the inlet-valve 20 is opened and left open until a sufficient quantity of material has been introduced into the apparatus. At the same time steam is admitted to the steam-coils or steam-circulating passages. Then the inlet-valve 20 is closed and the exhaust appliance connected with the exhaust-pipe 11 is put into action, withdrawing air from the cooker and creating a vacuum in which the material is cooked to the best advantage at a lower temperature and with a minimum of steam-pressure. Only enough material is introduced into the apparatus at one time to provide for a thin layer of cotton-seed meats on each heated floor or horizontal partition, and as the thin layers of meats are kept in constant motion from one cooking-compartment to the next one below they will be thus thoroughly cooked without any liability to burning, scorching, or other injury.

Cooking the cotton-seed meat under a vacuum and in thin layers at a low pressure in the manner described permits the ready and economical production of a higher grade of oil, a higher grade of cake, and consequently a higher grade of cotton-seed meal, and removes all danger of burning any of the products.

With this apparatus the cotton-seed meats may be thoroughly cooked under a vacuum while distributed in thin layers on the heated surfaces of the several cooking-compartments.

If desired, the exhaust-pipe 11 may be connected separately with each of the several cooking-compartments by a branch pipe 11$^a$, as indicated by dotted lines in Fig. 1, to provide more directly for inducing a vacuum in each compartment of the apparatus.

By cooking cotton-seed meats in a vacuum I am enabled to employ a very low temperature—that is to say, I can employ a low steam-pressure, and consequently cook at a low temperature, which does not deteriorate the oil and also prevents the formation of water-balls in the meats. These water-balls, which would be otherwise formed by the water in the meats, are apt to accumulate rapidly and become larger and larger as the meats are agitated. Again, a certain amount of hulls are usually mingled with the meats, and these when subjected to a high temperature give out an objectionable stain, which darkens the oil as well as the meats, and this is very objectionable when the meats are made into cakes. By cooking in thin layers and under a vacuum these hulls, as well as the meats, will cook at a lower temperature and all staining will be avoided. By keeping the meats in a state of constant agitation during the cooking operation they can be thoroughly and rapidly cooked without any danger of burning or scorching while in a thin strata in each cooking-compartment, and this also is a great advantage.

The cooking of cotton-seed meats in a vacuum, drawing off the vapor as rapidly as formed, avoids the usual danger of deterioration in the products due to retention of moisture therein, and, besides, by this process of cooking the products are of a much higher grade than usual and are much more economically obtained than by other processes.

The degree of vacuum employed should be as strong as is necessary to enable the cotton-seed meats to be cooked at as low a temperature as is possible. Although the amount of steam to be used would vary somewhat according to the moisture contained in the seed, the temperature should be sufficient to effect a thorough and rapid cooking of the thin layers of cotton-seed meats without danger of burning or scorching and without subjecting the products to liability of stain or other injury. The vacuum should be as perfect as practicable.

What I claim as my invention is—

The herein-described process of cooking cotton-seed meats, which consists in dividing the entire body of material into a number of thin layers, repeatedly exposing said thin layers of cotton-seed meats to the action of a low cooking temperature in contact with heated surfaces and under a vacuum, and maintaining said thin layers of meats in a constant state of agitation, whereby scorching and staining of the meats is avoided, substantially as specified.

In testimony whereof I have hereunto set my hand in presence of two subscribing witnesses.

WALTER H. COOK.

Witnesses:
PORTER PARKER,
FELIX J. PUIG.